(12) United States Patent
Ferguson

(10) Patent No.: US 9,744,667 B1
(45) Date of Patent: Aug. 29, 2017

(54) SYSTEM AND METHOD FOR PROMOTING SAFETY OF A ROBOTIC APPENDAGE

(71) Applicant: Fetch Robotics, Inc., San Jose, CA (US)

(72) Inventor: Michael Ferguson, San Jose, CA (US)

(73) Assignee: Fetch Robotics, Inc., San Jose, CA (US)

( * ) Notice: Subject to any disclaimer, the term of this patent is extended or adjusted under 35 U.S.C. 154(b) by 0 days.

(21) Appl. No.: 15/135,189

(22) Filed: Apr. 21, 2016

(51) Int. Cl.
*G05B 19/418* (2006.01)
*B25J 9/16* (2006.01)
*B25J 9/00* (2006.01)

(52) U.S. Cl.
CPC ........... *B25J 9/1653* (2013.01); *B25J 9/0084* (2013.01); *B25J 9/1638* (2013.01); *B25J 9/1664* (2013.01); *B25J 9/1666* (2013.01)

(58) Field of Classification Search
CPC ...... B25J 9/1653; B25J 9/0084; B25J 9/1638; B25J 9/1664; B25J 9/1666
See application file for complete search history.

(56) References Cited

U.S. PATENT DOCUMENTS

| | | | | |
|---|---|---|---|---|
| 2,957,693 | A * | 10/1960 | Ross | A63G 33/00 261/23.2 |
| 4,931,603 | A * | 6/1990 | Castonguay | H01H 1/5833 218/1 |
| 2006/0043930 | A1* | 3/2006 | Koyanagi | B25J 19/005 320/114 |
| 2011/0279231 | A1* | 11/2011 | Schwenkel | G05B 19/4186 340/9.1 |

* cited by examiner

*Primary Examiner* — Ian Jen
(74) *Attorney, Agent, or Firm* — J. Steven Svoboda

(57) ABSTRACT

A system for promoting safety of a robotic appendage includes: a robot controller; and a robot controllable by the robot controller, the robot controller configured to compute an estimated power draw of a planned trajectory of the robot, the robot controller further configured to modify the planned trajectory to prevent the estimated power draw from exceeding a power limit; the robot comprising: an appendage; an appendage controller configured to control the appendage; and a breaker configured to limit power delivered to the appendage. A system for promoting safety of a robotic appendage includes a plurality of robots operably connected with each other, the robots configured to communicate with each other regarding estimated power draw characteristics.

60 Claims, 2 Drawing Sheets

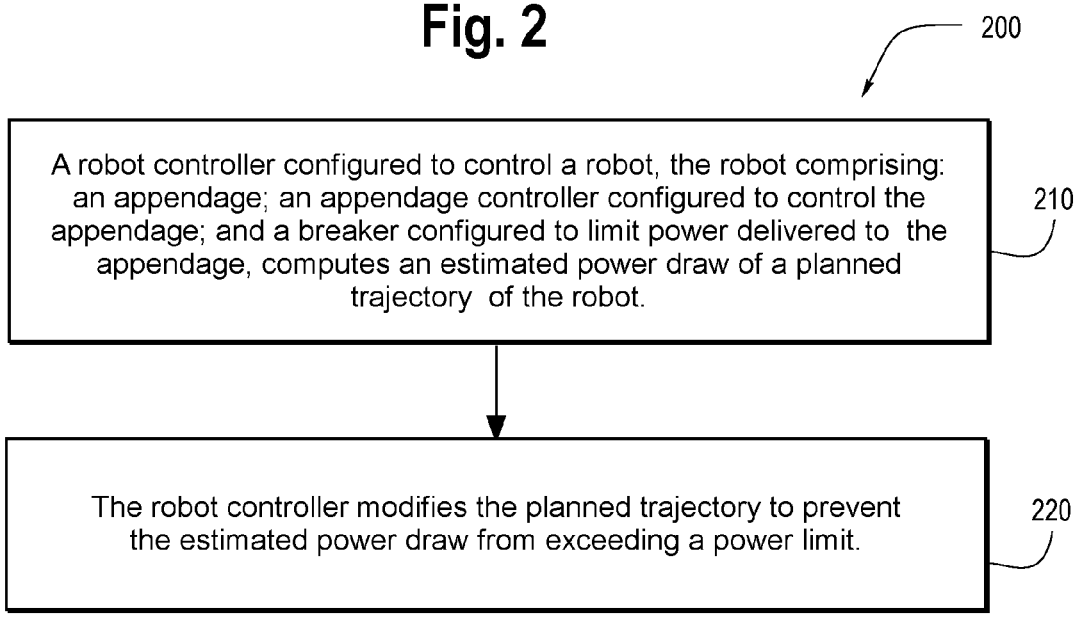
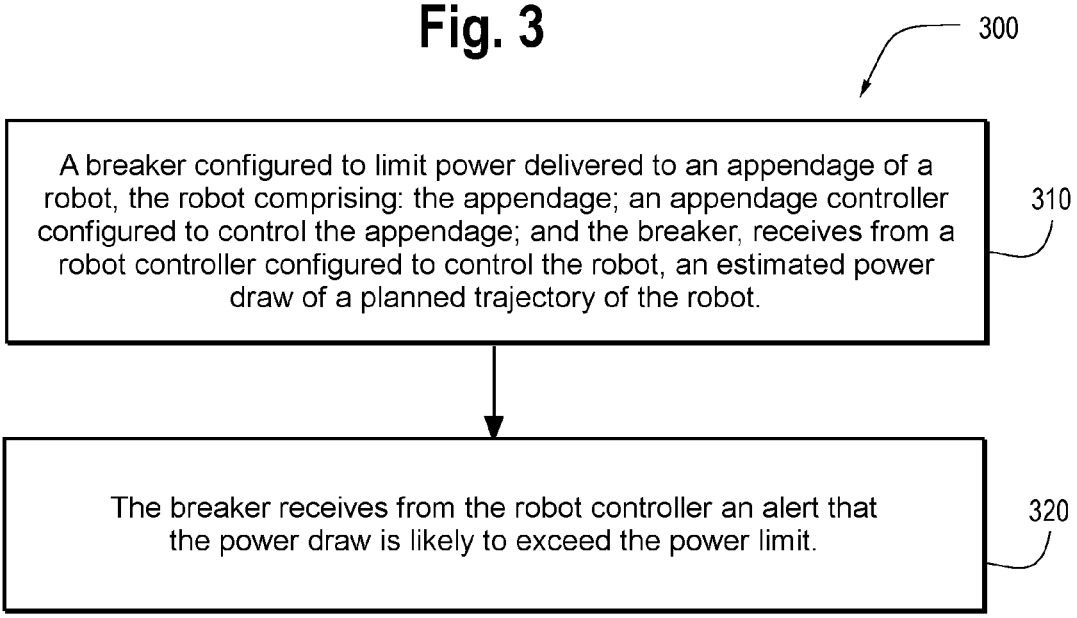

SYSTEM AND METHOD FOR PROMOTING SAFETY OF A ROBOTIC APPENDAGE

PRIORITY CLAIM

The present application claims the priority benefit of U.S. provisional patent application No. 62/150,380 filed Apr. 21, 2015 and entitled "System and Method for Easier Safety Rating of a Robotic Appendage," the disclosure of which is incorporated herein by reference.

SUMMARY

Embodiments of this invention relate in general to a system and method for promoting safety of a robotic appendage.

A system for promoting safety of a robotic appendage includes: a robot controller; and a robot controllable by the robot controller, the robot controller configured to compute an estimated power draw of a planned trajectory of the robot, the robot controller further configured to modify the planned trajectory to prevent the estimated power draw from exceeding a power limit; the robot comprising: an appendage; an appendage controller configured to control the appendage; and a breaker configured to limit power delivered to the appendage.

A method for promoting safety of a robotic appendage, including: computing, by a robot controller configured to control a robot, the robot including: an appendage; an appendage controller configured to control the appendage; and a breaker configured to limit power delivered to the appendage, an estimated power draw of a planned trajectory of the robot; and modifying, by the robot controller, the planned trajectory to prevent the estimated power draw from exceeding a power limit.

A method for promoting safety of a robotic appendage includes: receiving, by a breaker configured to limit power delivered to an appendage of a robot, the robot including: the appendage; an appendage controller configured to control the appendage; and the breaker, from a robot controller configured to control the robot, an estimated power draw of a planned trajectory of the robot; receiving, by the breaker, from the robot controller, an alert that the power draw is likely to exceed the power limit; and terminating delivery of power to the appendage, by the breaker, when the power draw exceeds the power limit.

A system for promoting safety of a robotic appendage includes: a plurality of robots operably connected with each other, the robots configured to communicate with each other regarding estimated power draw characteristics.

DESCRIPTION OF THE DRAWINGS

FIG. 2 is a flow chart of a method for promoting safety of a robotic appendage.

FIG. 3 is a flow chart of a method for promoting safety of a robotic appendage.

DETAILED DESCRIPTION

Figure 1:
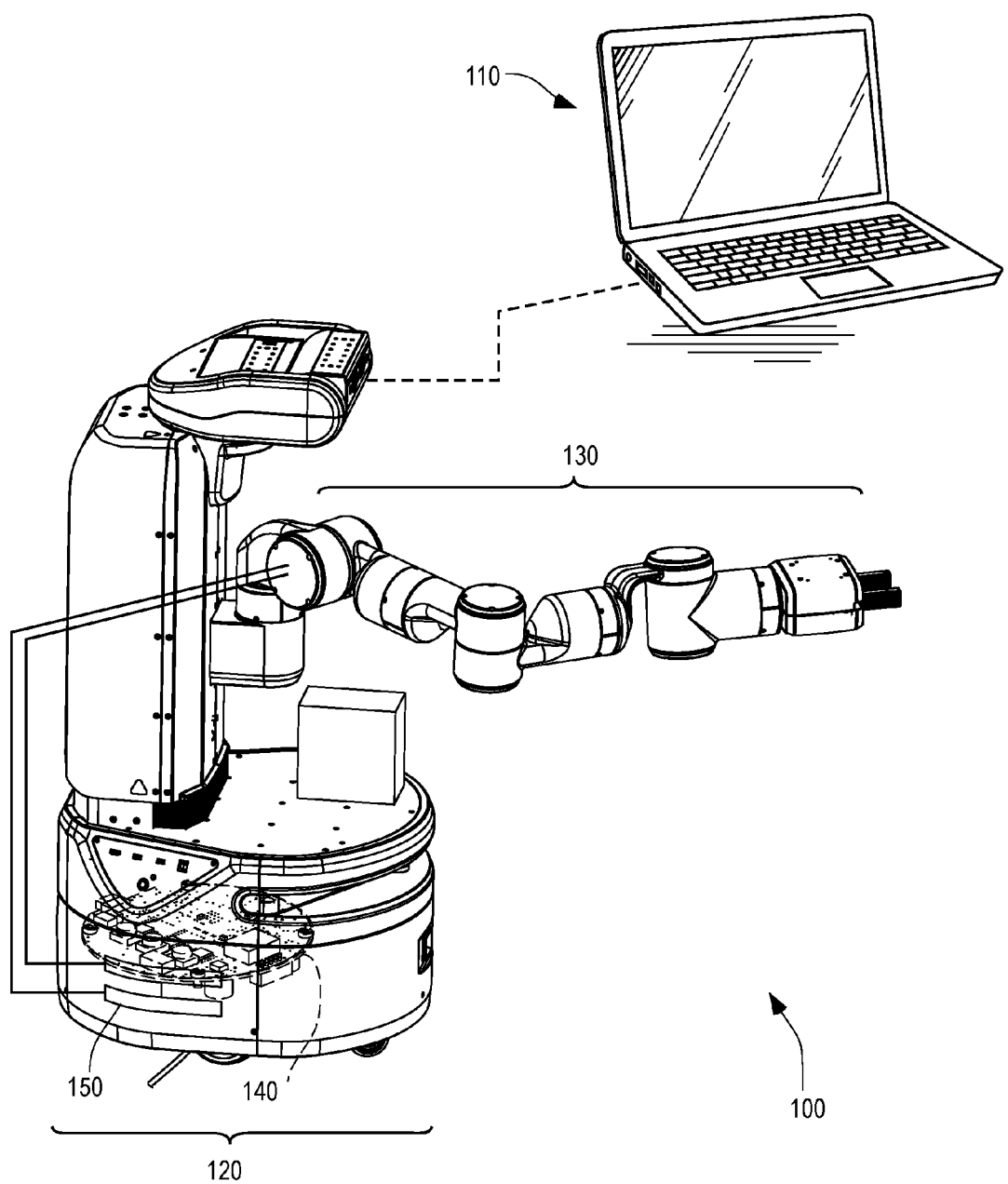
FIG. 1 is a block diagram of a system for promoting safety of a robotic appendage.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

The system and method for promoting safety of a robotic appendage includes a plurality of components such as one or more of electronic components, hardware components, and computer software components. A number of such components can be combined or divided in the system. An example component of the system includes a set and/or series of computer instructions written in or implemented with any of a number of programming languages, as will be appreciated by those skilled in the art.

The system in one example employs one or more computer-readable signal-bearing media. The computer-readable signal bearing media store software, firmware and/or assembly language for performing one or more portions of one or more implementations of the invention. The computer-readable signal-bearing medium for the system in one example comprises one or more of a magnetic, electrical, optical, biological, and atomic data storage medium. For example, the computer-readable signal-bearing medium comprises floppy disks, magnetic tapes, CD-ROMs, DVD-ROMs, hard disk drives, downloadable files, files executable "in the cloud," and electronic memory.

Embodiments of this invention relate in general to a system and method for promoting safety of an appendage, and more particularly to a system and method for promoting safety of a robotic appendage, and yet more particularly to a system and method for promoting safety of a robotic arm.

According to embodiments of the invention, a system for promoting safety of a robotic appendage comprises a robot controller and further comprises a robot. For example, the robot comprises the robot controller. For example, the robot does not comprise the robot controller. For example, the robot is controllable by the robot controller. For example, the robot comprises at least one appendage. For example, the appendage comprises an arm. For example, the appendage comprises a leg. For example, the robot comprises one or more appendage controllers configured to control a corresponding appendage. For example, the robot controller comprises the appendage controller. For example, at least one appendage is physically connected to the robot via a joint.

According to embodiments of the invention, the robot comprises a breaker configured to limit power delivered to the appendage. For example, in response to an alert from one or more of the robot controller and the appendage controller, the breaker may limit power delivered to the appendage. For example, the robot controller is further configured to send an alert to the breaker that the power draw is likely to exceed a power limit. For example, the breaker limits the power delivered to the appendage if the breaker receives an alert from the robot controller that the power draw is likely to exceed the power limit.

For example, the breaker comprises a safety-rated breaker. For example, the breaker limits power delivered to the appendage to a predetermined power limit. For example, the power limit is designated by a user. For example, the breaker limits the power delivered to the appendage to approximately 80 watts. For example, the power limit is calculated by the robot controller. For example, the power limit comprises a power limit algorithm calculated by the robot controller and delivered by the robot controller to the breaker.

According to other embodiments of the invention, if the power draw exceeds the power limit, the breaker terminates the power draw delivered to the appendage. For example, if the power limit is exceeded, the breaker terminates the power draw delivered to the appendage controller. For example, if the power limit is exceeded, the breaker terminates both power delivered to the appendage controller and the power draw delivered to the appendage.

According to further embodiments of the invention, the robot may comprise a braking device. For example, the braking device may comprise an electrical braking device. For example, the braking device may comprise a mechanical braking device. For example, the braking device may comprise another type of braking device. For example, the braking device may be configured to brake the robot upon occurrence of a triggering event. For example, the triggering event may comprise a power termination by the breaker. For example, the triggering event may comprise a triggering event other than the power termination by the breaker.

According to additional embodiments of the invention, the robot controller is configured to compute a power draw of a planned trajectory of the robot. For example, the robot controller is configured to compute the power draw of a particular planned movement of the robot. For example, the robot controller computes the estimated power draw using one or more of a planned position for at least one point in the planned trajectory, a planned velocity for at least one point in the planned trajectory, and a planned acceleration for at least one point in the planned trajectory. For example, the planned position comprises a planned position of a joint. For example, the planned velocity comprises a planned velocity of a joint. For example, the planned acceleration comprises a planned acceleration of a joint.

According to still further embodiments of the invention, the robot controller is further configured to modify the planned trajectory to prevent the estimated power draw from exceeding the power limit. For example, the robot controller is configured to modify the planned trajectory by modifying one or more of a position of at least one joint, a velocity of at least one joint, and an acceleration of at least one joint. For example, the robot controller modifies the planned trajectory so that the planned trajectory is followed, but with a different time scale.

According to still further embodiments of the invention, the robot controller is further configured to modify a power draw model used to calculate the estimated power draw. For example, the robot controller modifies the power draw model based on measurements of joint power usage. For example, the robot controller modifies the power draw model based on an estimated power loss in a joint. For example, the robot controller modifies the power draw model based on an estimated friction loss in the joint. For example, the robot controller modifies the power draw model by reducing the friction loss in the joint. For example, the robot controller modifies the power draw model by estimating a current consumed by arm electronics. For example, the robot controller modifies the power draw model by estimating the current consumed by the arm electronics by estimating the current consumed by the arm electronics based on measurements of an actual power draw for a trajectory portion. For example, the robot controller modifies the power draw model by estimating the current consumed by the arm electronics based on measurements of the actual power draw at one or more of the joint and the whole robot.

For example, the robot further comprises a sensor. For example, the sensor comprises a camera. For example, the sensor is configured to transmit sensor data to the robot controller for use in planning the trajectory. For example, the sensor comprises one or more of a Red-Green-Blue-Depth (RGBD) camera, a stereo camera pair, a laser range finder, and another type of sensor.

For example, the robot controller is further configured to modify the planned trajectory by computing an estimated collision-free trajectory based on one or more of the sensor data and the power draw model.

According to other embodiments of the invention, the robot controller is configured to modify the planned trajectory, in response to the received camera data. For example, the robot controller modifies the planned trajectory by refining a geometric model of the robot.

For example, the robot controller plans the trajectory based on a static analysis comprising analysis of efforts required to overcome gravity. For example, the robot controller plans the trajectory based on a dynamic analysis comprising one or more of efforts required to overcome gravity, and efforts required to accelerate the joint.

According to additional embodiments of the invention, two or more robots may communicate between themselves to share information about their estimated power draw characteristics. For example, two or more robots operating in environments that are similar according to one or more predetermined criteria may communicate between themselves to share information about their power draw characteristics. For example, two or more robots operating in environments that are physically close together may communicate between themselves to share information about their power draw characteristics. For example, two or more robots may communicate with a server to share information about their power draw characteristics.

FIG. 1 is a block diagram of a system 100 for promoting safety of a robotic appendage. The system 100 comprises a robot controller 110. The system 100 further comprises a robot 120 controllable by the robot controller 110. The robot 120 comprises: an appendage 130, an appendage controller configured to control the appendage 140, and a breaker 150 configured to limit power delivered to the appendage 130. The breaker 150 is also operably connected to the appendage controller 140.

For example, the robot controller 110 comprises a processor 110. For example, the robot controller 110 comprises a computer 110. The robot controller 110 is configured to compute an estimated power draw of a planned trajectory of the robot 120. The robot controller is further configured to modify the planned trajectory to prevent the estimated power draw from exceeding a power limit.

FIG. 2 is a flowchart of a method 200 for determining and promoting safety of a robotic payload. The order of the steps in the method 200 is not constrained to that shown in FIG. 2 or described in the following discussion. Several of the steps could occur in a different order without affecting the final result.

In step 210, a robot controller configured to control a robot, the robot comprising: an appendage; an appendage controller configured to control the appendage; and a breaker configured to limit power delivered to the appendage, computes an estimated power draw of a planned trajectory of the robot. Block 210 then transfers control to block 220.

In step 220, the robot controller modifies the planned trajectory to prevent the estimated power draw from exceeding a power limit. Block 220 then terminates the process.

FIG. 3 is a flowchart of a method 300 for determining and promoting safety of a robotic payload. The order of the steps in the method 300 is not constrained to that shown in FIG. 3 or described in the following discussion. Several of the steps could occur in a different order without affecting the final result.

In step 310, a breaker configured to limit power delivered to an appendage of a robot, the robot comprising: the appendage; an appendage controller configured to control the appendage; and the breaker, receives from a robot controller configured to control the robot, an estimated power draw of a planned trajectory of the robot. Block 310 then transfers control to block 320.

In step 320, the breaker receives from the robot controller an alert that the power draw is likely to exceed the power limit. Block 320 then transfers control to block 330.

In block 330, the breaker terminates delivery of power to the appendage if the power draw exceeds the power limit. Block 330 then terminates the process.

For example, it will be understood by those skilled in the art that software used by the system and method for promoting safety of a robotic appendage may be located in any location in which it may be accessed by the system. It is intended, therefore, that the subject matter in the above description shall be interpreted as illustrative and shall not be interpreted in a limiting sense. For example, the robot controller rather than the robot can comprise the appendage controller. For example, the appendage controller may be located externally to the robot.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

What is claimed is:

1. A system for promoting safety of a robotic appendage, comprising:
   a robot controller; and
   a robot controllable by the robot controller, the robot controller configured to compute an estimated power draw of a planned trajectory of the robot, the robot controller further configured to modify the planned trajectory to prevent the estimated power draw from exceeding a power limit,
   the robot comprising:
      an appendage;
      an appendage controller configured to control the appendage; and
      a breaker configured to limit power delivered to the appendage.

2. The system of claim 1, wherein the robot further comprises a joint by which the appendage is physically connected to the robot.

3. The system of claim 1, wherein the appendage comprises one or more of an arm and a leg.

4. The system of claim 1, wherein the robot controller comprises the robot.

5. The system of claim 1, wherein the breaker is configured to limit the power in response to an alert from one or more of the robot controller and the appendage controller.

6. The system of claim 1, wherein the robot controller is further configured to send an alert to the breaker that the power draw is likely to exceed the power limit.

7. The system of claim 6, wherein the breaker limits the power delivered to the appendage if the breaker receives an alert.

8. The system of claim 7, wherein the breaker limits the power delivered to the appendage to a power limit.

9. The system of claim 8, wherein the power limit is designated by a user.

10. The system of claim 8, wherein the power limit comprises a power limit algorithm.

11. The system of claim 10, wherein the robot controller calculates the power limit using the power limit algorithm.

12. The system of claim 11, wherein the robot controller delivers the calculated power limit to the breaker.

13. The system of claim 12, wherein the breaker is further configured to terminate the delivery of power to the appendage if the power draw exceeds the power limit.

14. The system of claim 13, wherein the breaker is further configured to terminate the delivery of power to the appendage controller if the power draw exceeds the power limit.

15. The system of claim 1, wherein the robot further comprises a braking device configured to brake the robot upon occurrence of a triggering event.

16. The system of claim 15, wherein the triggering event comprises a power termination by the breaker.

17. The system of claim 2, wherein the robot controller is further configured to compute a power draw of a planned trajectory of the robot.

18. The system of claim 17, wherein the planned trajectory comprises a planned movement of the robot.

19. The system of claim 17, wherein the robot controller computes the estimated power draw using one or more of a planned position for at least one point in the planned trajectory, a planned velocity for at least one point in the planned trajectory, and a planned acceleration for at least one point in the planned trajectory.

20. The system of claim 19, wherein the planned position comprises a planned position of the joint.

21. The system of claim 19, wherein the planned velocity comprises a planned velocity of the joint.

22. The system of claim 19, wherein the planned acceleration comprises a planned acceleration of the joint.

23. The system of claim 20, wherein the robot controller is configured to modify the planned trajectory by modifying one or more of the position of the joint, the velocity of the joint, and the acceleration of the joint.

24. The system of claim 1, wherein the robot controller modifies the planned trajectory so that the planned trajectory is followed, but with a different time scale.

25. The system of claim 2, wherein the robot controller is further configured to compute the estimated power draw by modifying a power draw model.

26. The system of claim 25, wherein the robot controller is further configured to modify the power draw model based on measurements of joint power usage.

27. The system of claim 26, wherein the robot controller modifies the power draw model based on an estimated power loss in the joint.

28. The system of claim 26, wherein the robot controller modifies the power draw model based on an estimated friction loss in the joint.

29. The system of claim 28, wherein the robot controller modifies the power draw model by reducing the friction loss in the joint.

30. The system of claim 26, wherein the robot controller modifies the power draw model by estimating a current consumed by arm electronics.

31. The system of claim 30, wherein the robot controller estimates the current consumed by the arm electronics based on measurements of an actual power draw for a trajectory portion.

32. The system of claim 30, wherein the robot controller estimates the current consumed by the arm electronics based on measurements of the actual power draw at one or more of the joint and the whole robot.

33. The system of claim 2, wherein the robot further comprises a sensor configured to transmit sensor data to the robot controller for use in planning the trajectory.

34. The system of claim 33, wherein the sensor comprises a camera.

35. The system of claim 33, wherein the robot controller is further configured to modify the planned trajectory in response to the sensor data.

36. The system of claim 35, wherein the robot controller is further configured to modify the planned trajectory by computing an estimated collision-free trajectory based on one or more of the sensor data and the power draw model.

37. The system of claim 35, wherein the robot controller is further configured to modify the planned trajectory by refining a geometric model of the robot.

38. The system of claim 35, wherein the robot controller is further configured to plan the trajectory based on static analysis comprising analysis of efforts required to overcome gravity.

39. The system of claim 35, wherein the robot controller is further configured to plan the trajectory based on a dynamic analysis comprising one or more of efforts required to overcome gravity, and efforts required to accelerate the joint.

40. A method for promoting safety of a robotic appendage, comprising:
    computing, by a robot controller configured to control a robot, the robot comprising: an appendage; an appendage controller configured to control the appendage; and a breaker configured to limit power delivered to the appendage, an estimated power draw of a planned trajectory of the robot; and
    modifying, by the robot controller, the planned trajectory to prevent the estimated power draw from exceeding a power limit.

41. The method of claim 40, further comprising an additional step, performed after the step of computing and before the step of modifying, of:
    sending, by the robot controller, to the breaker, an alert to the breaker that the power draw is likely to exceed the power limit.

42. The method of claim 40, further comprising an additional step, performed after the step of computing and before the step of modifying, of:
    calculating, by the robot controller, the power limit.

43. The method of claim 42, wherein the step of calculating comprises calculating, by the robot controller, the power limit using a power limit algorithm.

44. The method of claim 42, comprising an additional step, performed after the step of calculating, of:
    delivering, by the robot controller, to the breaker, the calculated power limit.

45. The method of claim 40, wherein the robot further comprises a joint by which the appendage is physically connected to the robot, and wherein the step of modifying comprises modifying one or more of the position of the joint, the velocity of the joint, and the acceleration of the joint.

46. The method of claim 40, wherein the step of modifying comprises modifying the planned trajectory so that the planned trajectory is followed, but with a different time scale.

47. The method of claim 46, wherein the step of modifying comprises a sub-step of computing the estimated power draw by modifying a power draw model.

48. The method of claim 47, wherein the step of modifying comprises modifying the power draw model by reducing the friction loss in the joint.

49. The method of claim 47, wherein the step of modifying comprises modifying the power draw model by estimating a current consumed by arm electronics.

50. The method of claim 49, wherein the step of modifying comprises estimating the current consumed by the arm electronics based on measurements of an actual power draw for a trajectory portion.

51. The method of claim 40, wherein the robot further comprises a sensor configured to transmit sensor data to the robot controller for use in planning the trajectory, and wherein the step of modifying further comprises modifying the planned trajectory in response to the sensor data.

52. The method of claim 51, wherein the step of modifying further comprises robot controller is further configured to modify the planned trajectory by computing an estimated collision-free trajectory based on one or more of the sensor data and the power draw model.

53. The method of claim 40, wherein the step of modifying further comprises modifying the planned trajectory by refining a geometric model of the robot.

54. The method of claim 40, wherein the step of modifying further comprises planning the trajectory based on static analysis comprising analysis of efforts required to overcome gravity.

55. The method of claim 40, wherein the step of modifying further comprises planning the trajectory based on a dynamic analysis comprising one or more of efforts required to overcome gravity, and efforts required to accelerate the joint.

56. A method for promoting safety of a robotic appendage, comprising:
    receiving, by a breaker configured to limit power delivered to an appendage of a robot, the robot comprising: the appendage; an appendage controller configured to control the appendage; and the breaker, from a robot controller configured to control the robot, an estimated power draw of a planned trajectory of the robot;
    receiving, by the breaker, from the robot controller, an alert that the power draw is likely to exceed the power limit; and
    terminating delivery of power to the appendage, by the breaker, when the power draw exceeds the power limit.

57. A system for promoting safety of a robotic appendage, comprising:
    a plurality of robots operably connected with each other, the robots configured to communicate with each other regarding estimated power draw characteristics.

58. The system of claim 57, wherein the plurality of robots operate in environments that are one or more of physically close together and similar.

59. The system of claim 57, wherein the plurality of robots communicate between themselves to share information about their power draw characteristics.

60. The system of claim 57, wherein the plurality of robots is operably connected with a server with which the plurality of robots is configured to share information regarding power draw characteristics.

* * * * *

UNITED STATES PATENT AND TRADEMARK OFFICE
CERTIFICATE OF CORRECTION

| | | |
|---|---|---|
| PATENT NO. | : 9,744,667 B1 | Page 1 of 1 |
| APPLICATION NO. | : 15/135189 | |
| DATED | : August 29, 2017 | |
| INVENTOR(S) | : Michael Ferguson | |

It is certified that error appears in the above-identified patent and that said Letters Patent is hereby corrected as shown below:

On the Title Page

Add item (60), "Related U.S. Application Data":
"Provisional application No. 62/150,380, filed on April 21, 2015."

Signed and Sealed this
Twenty-third Day of August, 2022

*Katherine Kelly Vidal*

Katherine Kelly Vidal
*Director of the United States Patent and Trademark Office*